Sept. 12, 1933.    G. P. ANSTISS    1,926,221
SLICING MACHINE
Filed Oct. 27, 1930    2 Sheets-Sheet 1
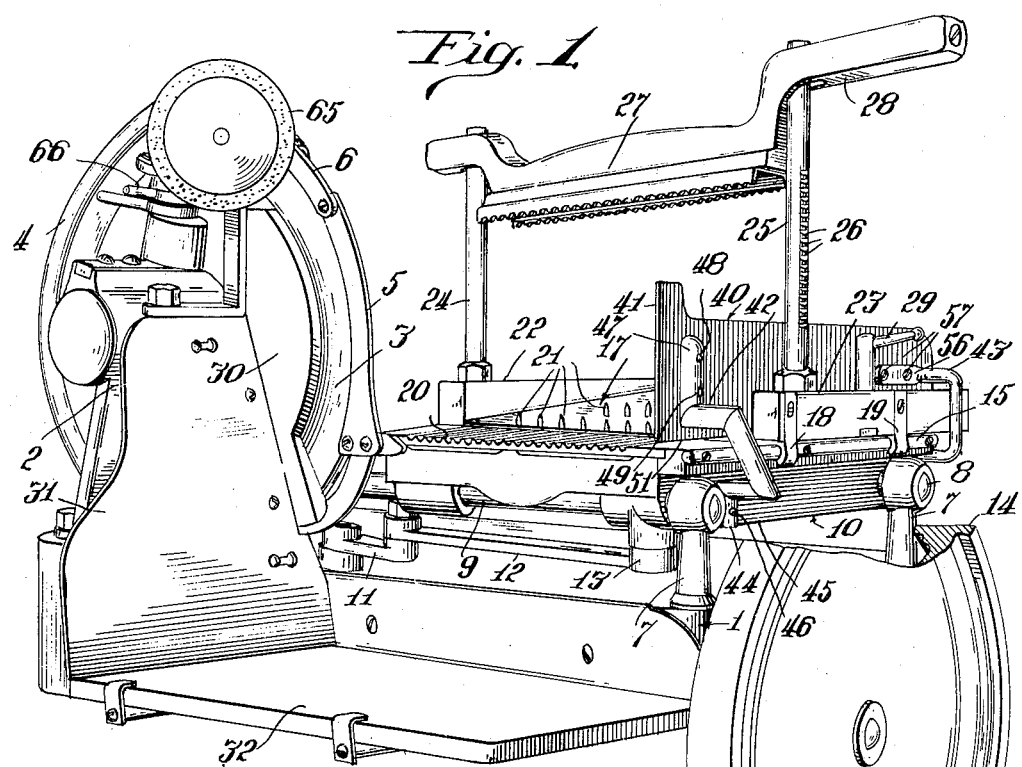
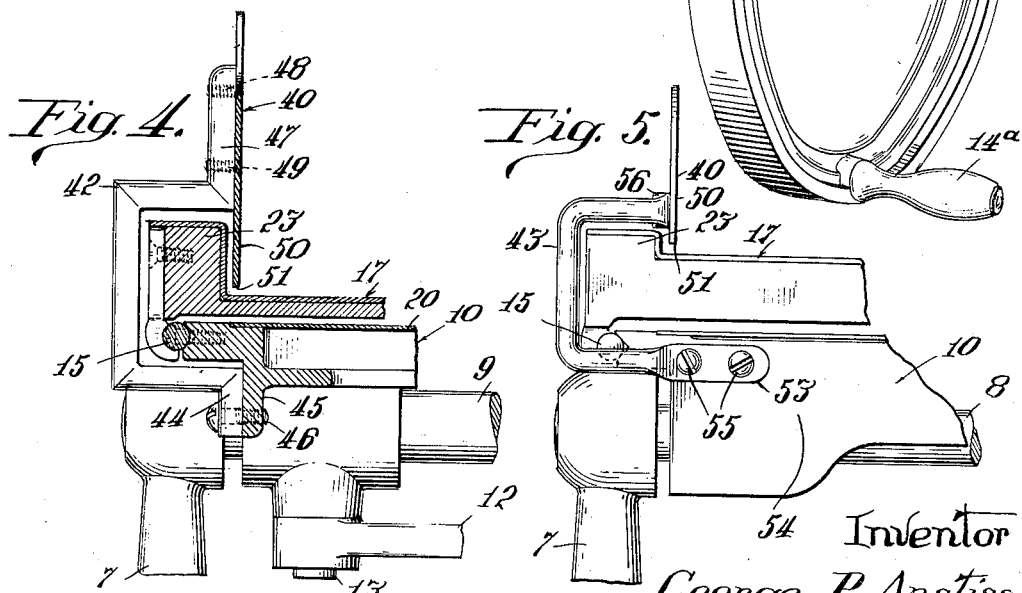
Inventor
George P. Anstiss Sept. 12, 1933.   G. P. ANSTISS   1,926,221
SLICING MACHINE
Filed Oct. 27, 1930   2 Sheets-Sheet 2

Witness
Milton Lenoir

Inventor
George P. Anstiss
By Brown, Jackson, Boettcher & Dienner
Attorneys.

Patented Sept. 12, 1933

1,926,221

UNITED STATES PATENT OFFICE 1,926,221

SLICING MACHINE

George P. Anstiss, River Forest, Ill., assignor to G. S. Blakeslee & Co., Cicero, Ill., a corporation of Illinois Application October 27, 1930. Serial No. 491,416

3 Claims. (Cl. 146—102)

This invention relates to slicing machines.

Slicing machines consisting of a rotating cutter, usually a disk and a reciprocating table upon which the produce to be cut is supported, are commonly used to slice cooked meats and the like. The table is automatically advanced upon the return or non-cutting part of its reciprocation to advance the meat into the cutter a distance equal to the desired thickness of the slice. When machines of this kind are employed to cut meat containing a quantity of fat, or meat that is pre-cooked, considerable difficulty has been experienced in preventing shredding of the meat under the action of the disk cutter. That is, as the disk advances through the chunk of meat and approaches the back or unsupported side of it, the pressure of the disk on the meat tends to push it back out of the cutting plane of the machine, with the result that the slice is made thinner than the desired thickness and frequently the cutter runs out of the meat before the slice is completely severed therefrom. This action is particularly noticeable when there is an appreciable amount of fat on the back side of the chunk of meat, since this fat is more easily pushed out of the plane of the cutter than is the more solid meat.

When the table is again advanced after the cutting stroke has been completed, the pressure of the disk is withdrawn from the fat and it is thereby permitted to resume its former shape, with the result that when the next slice is cut from the piece of meat, a double thickness portion of fat is attached to it and must be cut therefrom and discarded by the merchant.

This same action also occurs in the cutting of meats which do not contain fat and results in a shredding of the meat, with the result that the cutter forces its way out of the meat before the slice has been completely severed from the main body of meat. In either event, the slices formed by the machine are irregular and therefore not satisfactory and the amount of wastage that the merchant must write off as a loss is thereby increased.

My present invention aims at the reduction of this wastage and improvement of the slicing machine by providing for the support of the back or trailing edge of the meat during the operation of the cutting disk, that support extending up to the cutting plane so that thin slices may be cut from the chunk of meat with the assurance that the cutter will remain in the meat until the slice has been completely severed from the main body.

Now to acquaint those skilled in the art with the teachings of my invention, reference is made to the accompanying drawings in which a preferred embodiment of it is shown by way of example, and in which:

Figure 1 is a perspective view of a slicing machine equipped with the guide of my invention;

Figure 4 is a cross-sectional view taken along the line 4—4 of Figure 2 showing the mounting of the guide upon the slicing machine; and Figure 5 is a fragmentary end view of the machine showing also the mounting of the guide member thereon.

Figure 2:
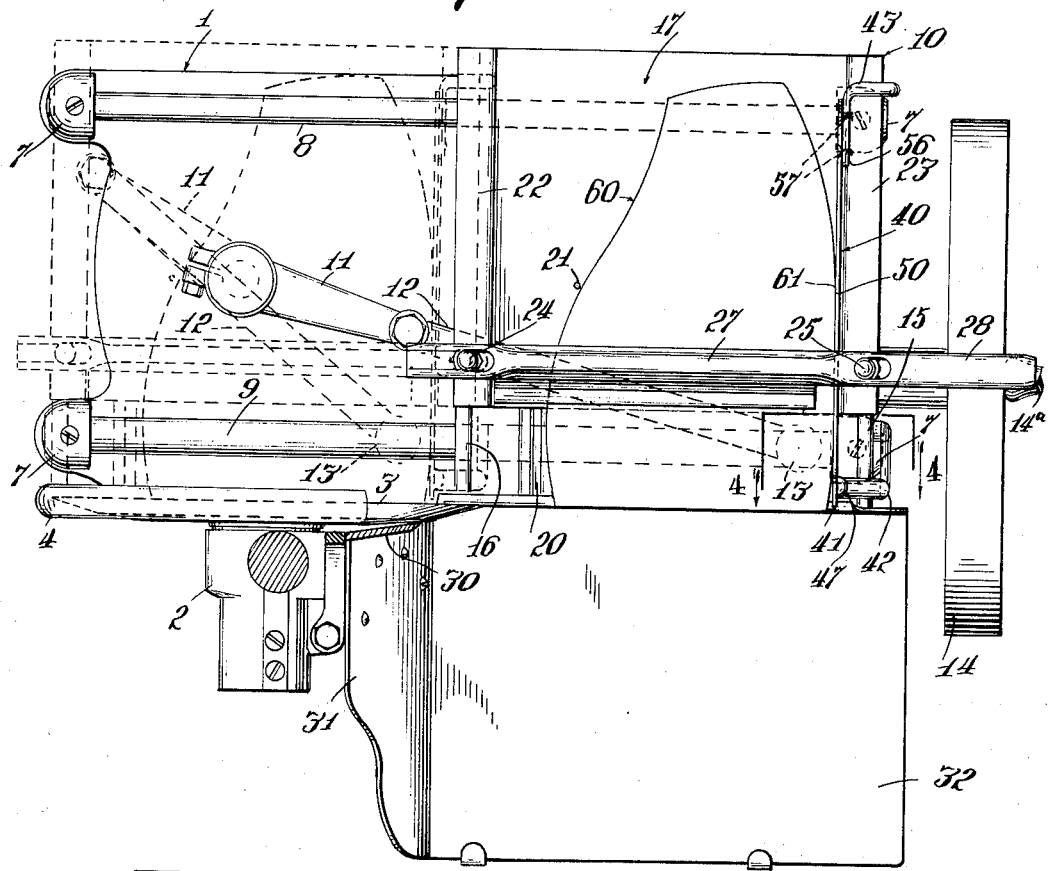
Figure 2 is a plan view of the machine shown in Figure 1 partly in section.
Figure 3:
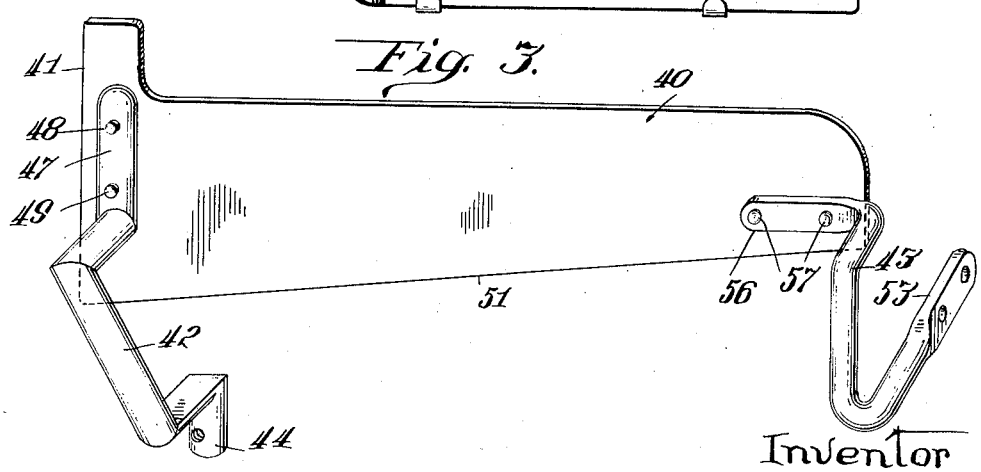
Figure 3 is a perspective view of my improved guide.

Referring now to the drawings in more detail, the slicing machine comprises a main bed or frame 1 which is preferably generally rectangular in shape and composed of cast iron or other suitable metal. A boss 2, extending from this bed in a generally vertical direction, serves as a support for the axle of the rotating disk 3, which axle, not shown, is located in a horizontal plane some distance above the bed of the machine. Preferably, the cutter 3 having a beveled cutting edge which is maintained sharp and free from wire edges to thereby better enable it to accurately cut thin slices from a chunk of meat. The disk is protected by guide members 4, 5 and 6 to prevent the operator from coming into contact with the cutting edge during the operation of the machine.

The bed 1 is also provided with a plurality of posts 7 upon which are supported parallel horizontal guide rods 8 and 9, these rods being disposed at right angles to the axis of the rotating disk 3.

A sub-base 10 is slidably supported on the guide rods 8 and 9 and arranged to be reciprocated thereon in any preferred manner, such as by the bell crank 11 and connecting rod 12 which is pivoted at 13 to the sub-base.

As shown in the drawings, the machine is a hand driven one in which the disk 3 is rotated and the sub-base 10 reciprocated responsive to a turning of the fly wheel 14 by the crank handle 14a. The particular type of machine as shown in the drawings is shown by way of example only, as my invention is applicable to all types of slicing machines both hand driven and motor driven.

The sub-base 10 carries cross guide rods 15 and 16 upon which is mounted a table 17 by means of bearing members 18 and 19 which are arranged to slide longitudinally of these guide rods. The table 17 and the upper surface 20 of the sub-table 10 together form a support upon which the meat or other material that is to be sliced by the machine is supported. As shown, the table 17 is provided with a plurality of upwardly projecting sharp point prongs 21 which are embedded in the meat and serve to prevent it from moving longitudinally of the table during the operation of the machine.

The table is also provided with side members 22 and 23 out of which rise two vertical posts 24 and 25 which are serrated as at 26 and serve to support the meat clamp 27, which is raised and lowered vertically upon these posts to engage the meat and hold it upon the table. The clamp 27 is provided with suitable latching means contained in the candle 28 which engages the serrations 26 in the post 25 to lock the clamp in place once it has been shut down upon the meat.

The table is advanced toward the plane in which the cutter 3 is rotating by suitable means which has been omitted from the drawings, since it forms no essential part of the present invention. It is sufficient to note that a control lever 29 is provided in position of easy access and is operable to engage and indicate the table feed mechanism to thereby control the movement of the table toward the cutting plane of the machine.

It will be seen that the parts of the machine thus far described are more or less standard. When a quantity of meat is placed upon the table 17 and the clamp 27 is pressed downward on the posts 24 and 25, it clamps the meat upon that table and the upper surface of the sub-table 20, firmly holding the meat against movement longitudinally of the table.

As the crank 14 is turned and the disk 3 thereby rotated, the table is reciprocated by the crankarm 11 to bring the meat into and out of engagement with the cutting edge of the disk 3. Each time the table is returned to the position, in which it is shown in Figures 1 and 2, the feed mechanism is operated to advance the table toward the plane of the cutter 3, thereby bringing more meat into the cutting plane to permit severing of another slice from it.

The slices thus severed from the machine are guided by guide plates 30 and 31 onto the slice table 32 where they are supported until the desired number of slices have been made. Preferably, though not necessarily so, the slice table 32 is made of vitreous material such as porcelain, and the guide plates 30 and 31 are highly polished so that they may be kept clean and sanitary.

As the sub-table 10 and meat carried thereby on the table 17 is advanced into the cutting edge of the disk 3 there is a tendency for the trailing edge of the meat, that is, the edge opposite to the point of engagement of the disk with the meat to be pushed backward out of the plane of the cutter. To resist such movement and thereby enable the machine to cut more perfect slices from the meat, I have provided a guide 40 which consists of a planar member having a straight vertical edge 41. This member is disposed in a vertical position adjacent the back or trailing edge of the table as it is being advanced into the cutter.

The guide 40 is supported upon the sub-table 10 by means of brackets 42 and 43, which are generally C-shaped and which extend up and over the table 17 to support the member 40 in a vertical plane in juxtaposition thereto. The particular shape and size of the mounting brackets 42 and 43 will, of course, be varied to meet the requirements of the particular slicing machine upon which my invention is installed, and the specific showing of the drawings is made by way of example only. As shown, the forward bracket 42 contains an L-shaped foot 44 which is attached to the flange 45 of the sub-table 10 by any preferred means, such as the screw 46. The member 42 extends outwardly from this foot 44 past the transverse guide rod 15 and then extends upwardly above the upper edge of the side member 23 of the table 17. At this point the member 42 bends inwardly and terminates in a vertical foot 47 to which the guide 40 is attached in any preferred manner, such as by the screws 48 and 49. By this arrangement the inner face 50 of the guide 40 is supported in a vertical plane adjacent the side member 23 of the table 17, and the lower edge 51 of this member 40 is supported some distance above the upper surface of the table 17.

The opposite end of the guide 40 is supported on the sub-base 10 by a bracket 43 which has a foot 53 attached to the flange 54 of the sub-base in any preferred manner, such as by the screws 55. This bracket 43 extends outwardly past the guide rod 15 and upwardly beyond the guide rod 23 of the table, from which point it again bends inwardly and terminates in a foot member 56 to which the guide 40 is attached in any preferred manner, such as by the screws 57.

The upper surface of the table 17 of the machine shown in the drawings slopes slightly downward toward the cutter 3 and therefore the lower edge 51 of the guide 40 is cut at a taper to register with the slope of this table. The brackets 42 and 43 support this member some distance above the upper surface of the table so that the table may be moved horizontally on the guide rods 15 and 16 without striking the lower edge 51 of the guide 40.

Brackets 42 and 43 are so shaped and positioned that the vertical edge 41 of the guide 40 is disposed in the cutting plane of the machine. Actually, of course, clearance must be allowed between the edge 41 and the cutting edges of the disk 3, since the guide member is moved past the cutting edge of the disk when the table is in its extreme forward position, as shown by the dotted lines in Figure 2. Preferably, the edge 41 is as near to the cutting edge of the disk as it is possible to make it; however, I have found that a clearance of ten or fifteen thousandths of an inch may be allowed without defeating the purpose of the guide 40, particularly if the slices of meat to be cut by the machine are thicker than this clearance width.

As will be seen in Figure 2, the meat 60 is placed upon the table 17 and held thereon by the clamp 27. The meat is so positioned that its trailing edge 61 abuts against the inside or forward surface of the guide 40 and is supported thereby as the table is moved into the cutting disk 3. This guide 40 is therefore enabled to support the trailing edge of the meat up to the time that the last part of the slice is severed from the body 60, and this support prevents the edge 61 of the meat from being turned back out of the plane of the cutting edge of the disk 3. A machine equipped with the guide of my invention is therefore capable of cutting slices of uniform thickness that extend all the way across the chunk of meat from which they are cut. The wastage occasioned by the removal of an excess quantity of fat from the edge of a slice of meat is thereby eliminated and that loss thereby saved to the merchant. In the operation of a machine of this kind, to cut thin slices from a piece of cooked tender meat, it is necessary that the cutting edge of the disk 3 be maintained keen and the machines are therefore usually provided with a grinding mechanism 65 which is rotatable into engagement with the disk by means of a cam lever 66 to enable sharpening of the cutting edge. This feature of the slicing machine is not of the essence of my invention and need not be explained in detail herein.

From the foregoing it will be apparent that I have provided a new and useful improvement in slicing machines, which has been illustrated and described in connection with a specific slicing machine, such illustration and description being by way of example only, inasmuch as the invention is obviously capable of being modified to adapt it to all kinds and types of slicing machines, which adaptation is within the contemplation of my invention. Throughout the description meat has been mentioned as the produce being cut by the slicing machine, such mention being also by way of example, since the invention can be applied to slicing machines that are designed to slice other commodities.

Having thus complied with the statutes and shown and described a preferred embodiment of my invention, what I consider new and desire to have protected by Letters Patent is pointed out in the appended claims.

What is claimed is:

1. The combination with a slicing machine comprising a rotating cutter, a pair of parallel rods disposed at right angles to the axis of rotation of said cutter, a sub-table slidably mounted on said rods, means for moving said sub-table back and forth on said rods, guide bars carried by said sub-table, a table mounted on said bars and overhanging said table, and means for moving said table in a direction normal to the direction of movement of said sub-table, of a generally rectangular planar guide, and a pair of C-shaped brackets attached to said sub-base and extending around the overhanging portion of and above said table and fixed to the guide for supporting the same in fixed position thereabove to hold against the cutter the produce placed upon the table.

2. A guide for attachment to slicing machines which have a rotating disc cutter for holding the produce being sliced by the cutter, a sub-table mounted for movement parallel to the plane of the disc and a table overhanging said sub-table and mounted thereon for movement normal to the plane of said disc, comprising a planar member having a straight edge disposed substantially in the plane of said disc, and a pair of C-shaped brackets removably attached to said sub-table and permanently attached to said member and extending around said overhanging portion of said table to support said member in a fixed position thereover.

3. A guide for attachment to slicing machines which have a rotating disc cutter, a sub-table mounted for movement in the plane of the disc and a table overhanging said sub-table and mounted thereon for movement normal to the plane of said disc, comprising a planar generally rectangular member, and a pair of one piece C-shaped brackets attached to said sub-table and member and extending around the overhanging portion of said table to support said member in a fixed position thereover in a plane normal to the planes of the disc and table and with one edge of the member substantially in the plane of the disc to hold the produce on the table against movement out of the plane of the disc.

GEORGE P. ANSTISS.